United States Patent [19]
Rodgers

[11] Patent Number: 5,697,182
[45] Date of Patent: *Dec. 16, 1997

[54] FISHING LURE

[76] Inventor: Nicholas A. Rodgers, c/o: Shaw & Co., SJO 892, P.O. Box 025216, Miami, Fla. 33102-521

[*] Notice: The term of this patent shall not extend beyond the expiration date of Pat. No. 5,330,282.

[21] Appl. No.: 508,964

[22] Filed: Jul. 28, 1995

Related U.S. Application Data

[63] Continuation-in-part of Ser. No. 439,375, May 11, 1995, Pat. No. 5,622,422, which is a continuation-in-part of Ser. No. 234,110, Apr. 28, 1994, Pat. No. 5,461,815, which is a continuation-in-part of Ser. No. 72,390, Jun. 7, 1993, Pat. No. 5,330,282.

[51] Int. Cl.$^6$ .................... A01K 85/00; A01K 79/02; A01K 75/02
[52] U.S. Cl. .................. 43/17.1; 43/17.6; 43/42.31
[58] Field of Search ................. 43/17.1, 17.6, 43/42.31

[56] References Cited

U.S. PATENT DOCUMENTS

| | | |
|---|---|---|
| 4,175,348 | 11/1979 | Ray . |
| 4,227,331 | 10/1980 | Ursrey et al. . |
| 4,250,650 | 2/1981 | Fima . |
| 4,805,339 | 2/1989 | Fuentes ................ 43/42.31 |
| 4,848,009 | 7/1989 | Rodgers . |
| 4,960,437 | 10/1990 | Watson ................ 43/42.31 |
| 4,970,808 | 11/1990 | Massie ................ 43/42.31 |
| 5,157,857 | 10/1992 | Livingston ............. 43/17.5 |
| 5,159,773 | 11/1992 | Gentry ................. 43/17.1 |
| 5,175,950 | 1/1993 | Linder ................. 43/17.1 |
| 5,175,951 | 1/1993 | Fruchey ................ 43/17.6 |
| 5,188,447 | 2/1993 | Chiang et al. . |
| 5,299,107 | 3/1994 | Ratcliffe .............. 43/17.6 |
| 5,330,282 | 7/1994 | Rodgers . |
| 5,331,760 | 7/1994 | Dumont ................. 43/17.1 |
| 5,392,555 | 2/1995 | Tingey ................. 43/17.6 |

*Primary Examiner*—Kurt Rowan
*Attorney, Agent, or Firm*—Dowell & Dowell

[57] ABSTRACT

A fishing lure will time an interval if a motion responsive switch closes in the absence of an interval. During the interval power is supplied to an output circuit. The output circuit may energize radiation probes, a light or a speaker.

18 Claims, 5 Drawing Sheets

FISHING LURE

This is a Continuation-in-Part of application Ser. No. 08/439,375 filed May 11, 1995, now U.S. Pat. No. 5,622,422, which is in turn a continuation in part of application 08/234,110 filed Apr. 28, 1994 now U.S. Pat. No. 5,461,815 which is in turn a continuation in part of application 08/072,390 filed Jun. 7, 1993 now U.S. Pat. No. 5,330,282.

This invention relates to a fishing lure. The inventive fishing lure is designed to provide a timing circuit which is controlled by a motion responsive switch to provide an output signal over a power interval, and no output signal between said power intervals.

In accord with the invention herein, the output signal may be used to power a light, an underwater speaker or a pair of field effect probes.

The light, sound, or field effect which may be produced by the output signal represent three variants of means to attract fish to the lure. These means may be used singly or in combination, subject to the comments following.

When the lure is in the water the fisherman sometimes cannot detect operation of the speaker and cannot detect operation of the field effect probes. Accordingly it is convenient to connect the light flashing facility so that if the speaker is operating during the power interval the light is on or flashing. Thus the fisherman, seeing the light, may use this as an indication that the speaker is operating. Similarly, by connecting the light to be on or flash during operation of the field effect probes, the fisherman receives an indication that the field effect probes are working.

In this application a "lure" may or may not have hooks. A lure without hooks, although not common is sometimes used as a "teaser" to attract groups of fish to the vicinity of the boat so that live bait may be presented (other than through the lure), The "light" that will form part of the lure will usually, although not necessarily be a light emitting diode "LED", since an LED provides relatively high intensity for relatively low demands on battery power.

The aural indication by the speaker will create pressure waves in the water which may create a tone within the range audible to humans. However the aural indication may, within the scope of the invention, involve the production of pressure waves at frequencies above and below the human hearing range but believed to be detectable to fish or some species of fish.

The invention comprises: a battery connectable to a timing circuit by a motion responsive switch. The timing circuit, responsive to an off-to-on transition of the motion responsive switch results in the timing of a power interval during which power is supplied over a timing circuit controlled connection from the battery to an output circuit. The timing circuit will control its timing connection and will not start timing a new power interval responsive to an off-to-on transition which occurs during the power interval but only to such off-to-on transition which occurs outside the power interval.

The output circuit is connected to receive power during the power interval. Thus, during the power interval, the output circuit may supply: an LED, a speaker or field effect probes. These may be used in various combinations it being noted that my prior application (Ser. No. 08/072,390 filed Jun. 7, 1993 now patented as U.S. Pat. No. 5,033,282) dated Jul. 19, 1994 deals with aspects of the use of an LED alone.

In all variants of the invention, a pair of sensor probes may be connected to control the battery and the motion responsive switch to the timing circuit, so that, when the probes are out of the water, the off-to-on transition of the motion responsive switch may not activate the timing mechanism. There is this provided an additional protection for battery life in that, not only does the timing circuit prolong battery life by limiting battery activation to a single power interval after the last off-to-on transition; but the activation of the timing circuit may only take place if the probes are in water.

The speaker frequency may be determined by a piezotronic diaphragm in the speaker. However, if this is found too high in frequency, a conventional speaker powered by an oscillator may be used.

In drawings which illustrate a preferred embodiment of the invention:

Figures 1, 2:
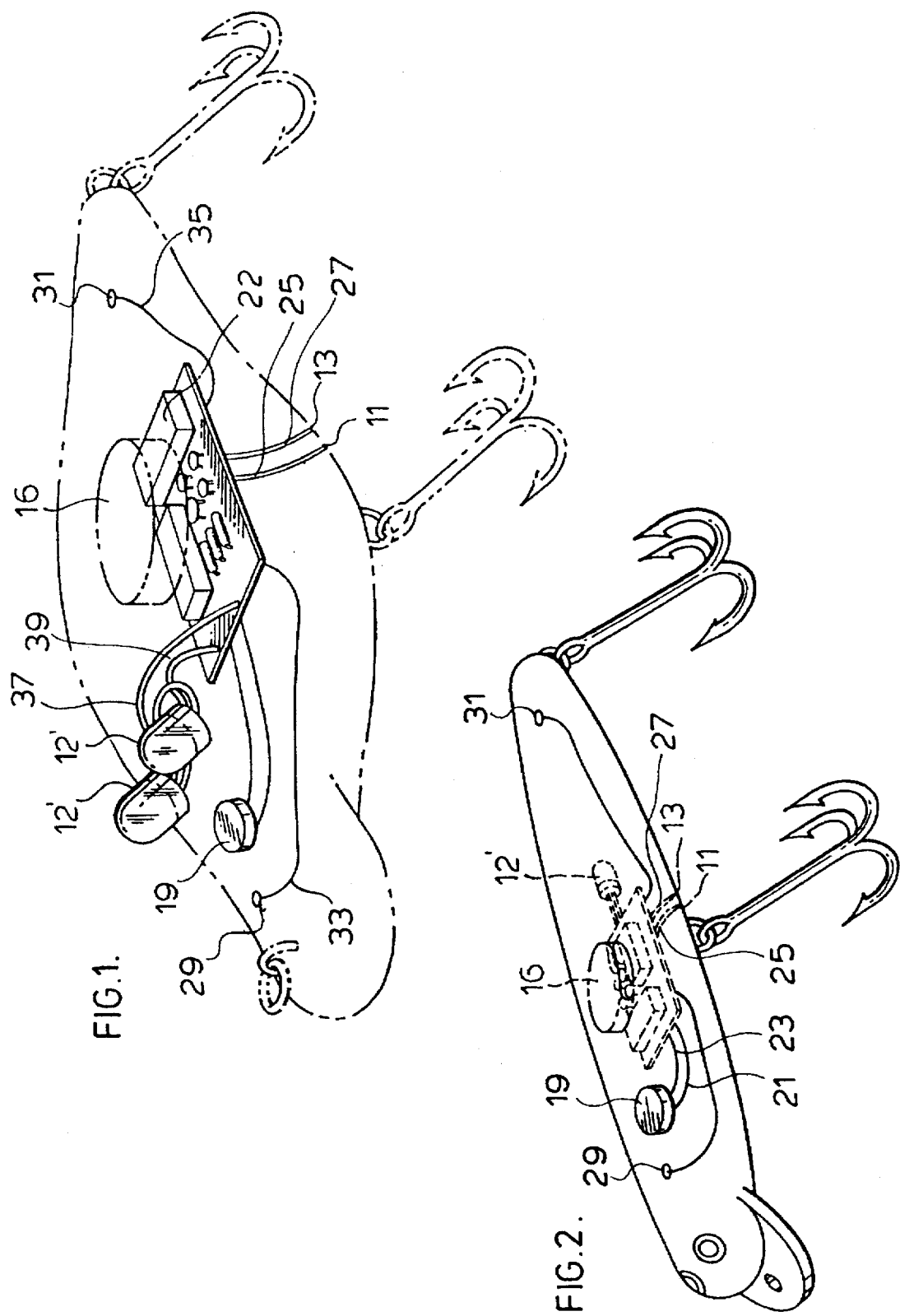
FIG. 1 shows a fishing lure constructed in accord with the invention.
FIG. 2 shows an alternate form of fishing lure in accord with the invention.
Figure 5:
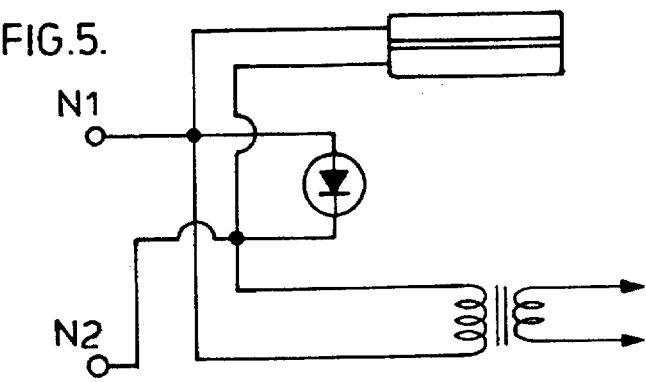
Figure 6:
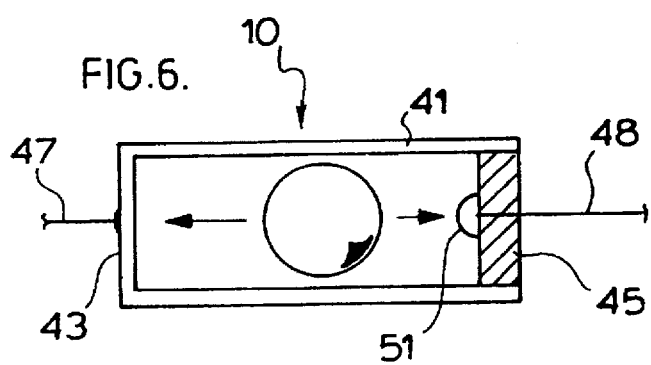
Figures 4, 4A:
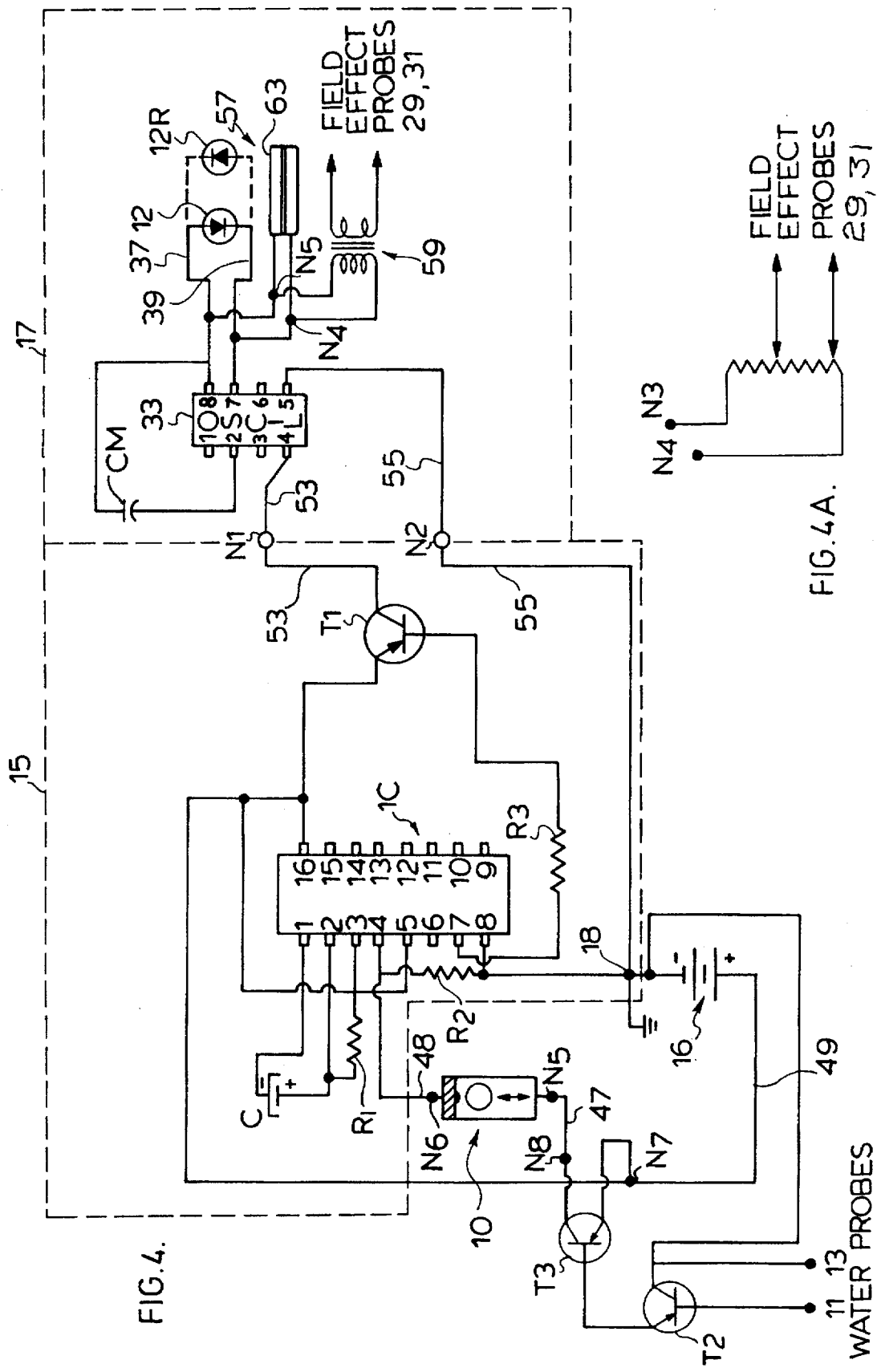
FIG. 4 shows a circuit in accord with the invention.
Figure 7:
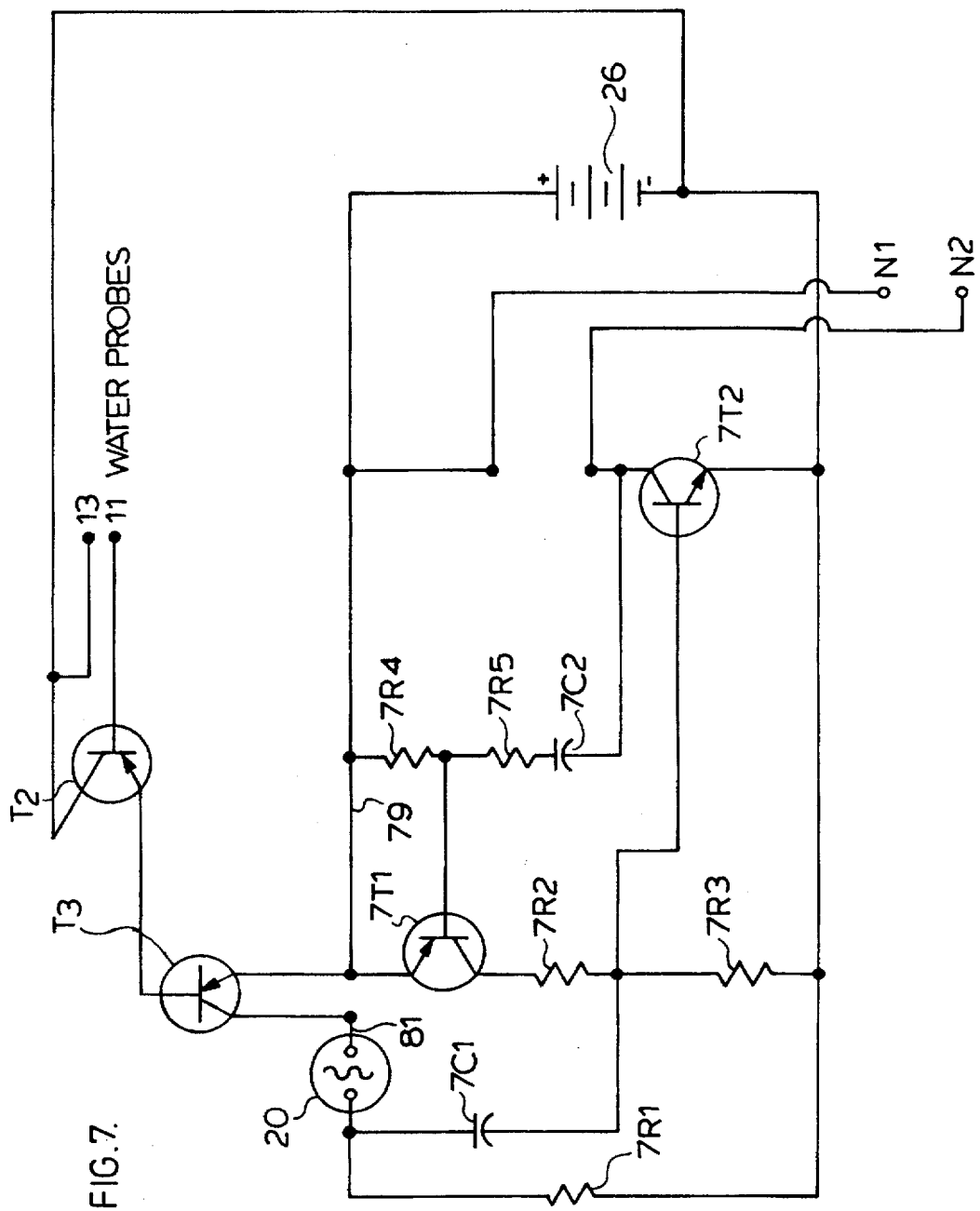
Figure 8:
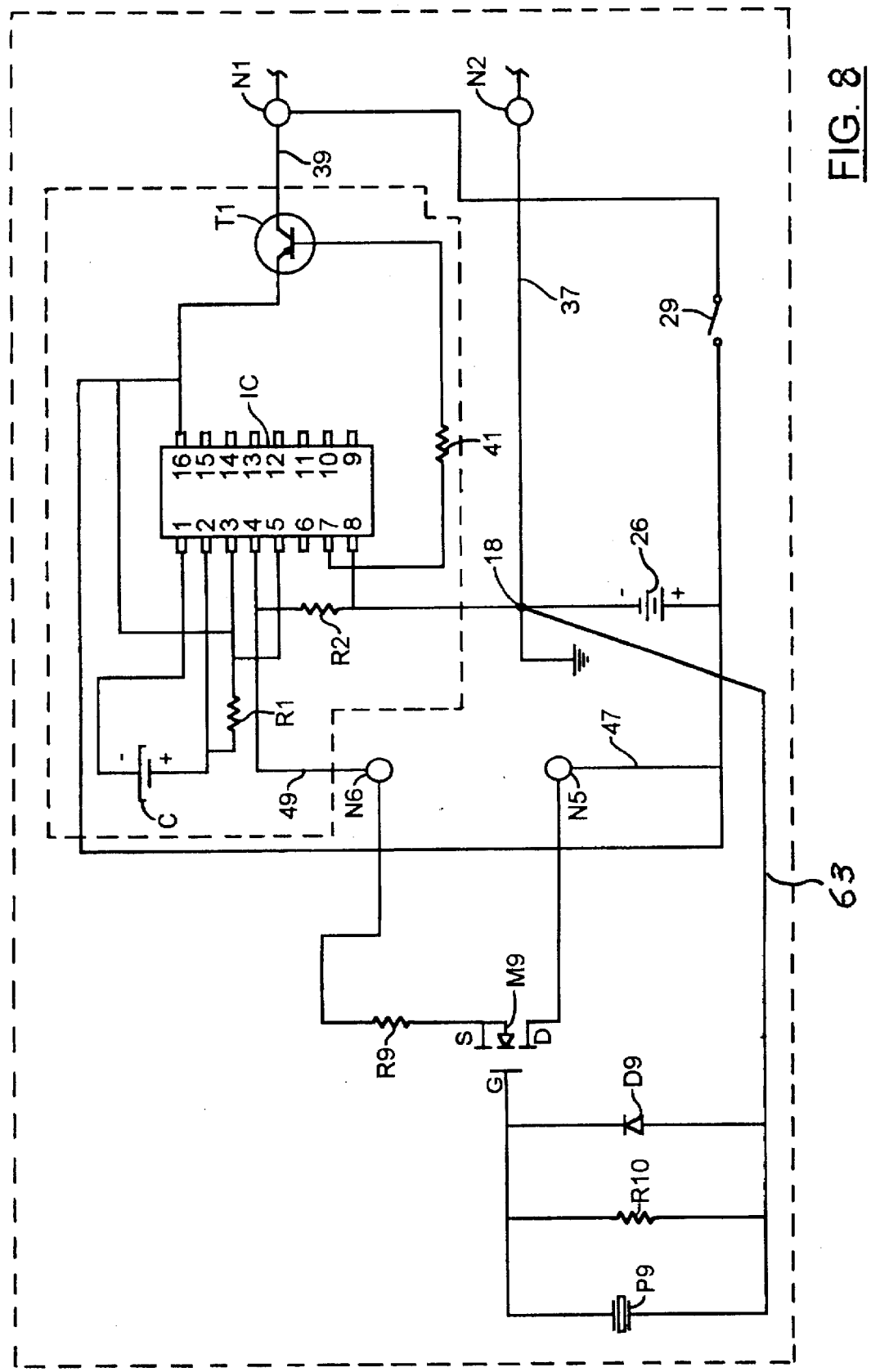

FIG. 4A shows circuitry for connecting the field effect probes which is alternate to that shown for powering the field effect probes in FIG. 4, FIG. 5 shows an alternate output circuit to that shown in FIG. 4, FIG. 6 shows a motion responsive switch for use with the circuitry of FIG. 4, FIG. 7 shows an alternate timing circuit to that shown in FIG. 4, FIG. 8 shows a circuit adapted to use a piezotronic crystal as the motion responsive switch, In FIG. 1 a fishing lure has an encapsulated battery 16, motion responsive switch, timing circuit, and output circuit, including the LED 12. The physical arrangement of these components is not shown in detail since it may be assembled in many ways. The electrical arrangement of the circuit is however shown in detail in FIG. 4 and an alternate arrangement is shown in FIG. 7.

In FIG. 1 a speaker 19 is shown, also encapsulated in the plastic of the lure. The speaker 19 is connected to the circuitry by leads 21 and 23. Water sensing probes 11 and 13 are exposed to the water on the surface of the lure. The water sensing probes are connected to the timing circuitry by leads 25 and 27. At each end of the body field effect probes 29 and 31 are shown as exposed to the surface of the body, at opposite ends of the lure. Such pair of probes may also be located laterally disposed on opposite sides of the lure or in any other selected locations. The probe, by virtue of the electric field between them) create an electric field in the water to attract the fish and simulate the charge generated by nerve endings in the muscles of all fish and animals when in motion.

(It is well documented that certain fish, particularly sharks, are equipped with sensory organs able to detect this minute discharge in open ocean and this ability is suspected in many, if not all fish).

The probes 29 and 31 are connected to the circuitry by leads 33 and 35 respectively.

LED's 12 (FIG. 4) are customarily provided with transparent lenses 12 which are customarily used both to encapsulate and protect the LED's and to focus or dispense the light for the LEDs. In FIG. 1, the LED's are located to project, like bulbous eyes from the lure body. The LED's will be connected in parallel as hereinafter discussed and are connected to the circuitry by leads 37 and 39.

FIG. 4 shows the preferred circuitry for electrical operation of a lure.

In FIG. 4 is shown timing circuitry 15 for timing an interval during which power is supplied to the output circuit 17.

Preferred values for the timing circuit elements are as follows:

IC—INTEGRATED CIRCUIT #RR8503 MC14528
T—TRANSISTOR #2N3906
C—CAPACITOR 0.47 µF at 30V
10—ACTIVATION SWITCH, MECHANICAL
12—LIGHT SOURCE (LED)
26—TWO BATTERIES, EACH OF 1½V
R1—RESISTOR 1 MEGOHM ⅛W
R2—RESISTOR 1 MEGOHM ⅛W
R3—RESISTOR 1 MEGOHM ⅛W (A mercury or a piezotronic switch may be used as an alternative to mechanical switch 10).

(The integrated circuit and transistor referred to above are both available from Motorola Canada Limited, 3125 Steeles Avenue East, North York, Ontario, Canada).

Preferably an additional means in the saving of battery power is water sensing responsive circuitry connected between nodes N7 and N8 in the lines 49 and 47 which are the remainder of the connection between the positive terminal of battery 16 and switch 10. With the water sensor in place, connection between N7 and N8 is controlled by probes 11 and 13 and transistors T2 and T3 connected as shown. If probes 11 and 13 are in an air environment, there is no conduction path therebetween and hence there is no bias on the base of T2 which is therefore non-conducting rendering T3 non-conducting. The gap between N7 and N8 thus acts as an open circuit and while such open circuit persists, and the circuitry cannot be activated by an off-to-on transition caused by the closure of switch 10. Thus a power interval of power to the output circuit cannot be initiated by such transition when probes 11 and 13 are in air. This prevents the expenditure of battery energy when the lure is not in the water.

On the other hand, when probes 11 and 13 are immersed in water (and the circuitry may be adapted for fresh or sea water), the water establishes a conducting path between probes 11 and 13. This turns the base of T2 negative relative to the emitter to turn on T2. When T2 turns on, the requisite negative bias is then applied to transistor T3 turning it on. Turning on T3 closes the conducting path between the positive terminal of battery 26 across gap N7–N8 to pin 4 of the IC.

With gap N7–N8 closed because probes 11 and 13 are in water the next following off-to-on transition of switch 10, will activate the circuitry as hereinafter described.

In operation with gap N7–N8 closed the switch 10 open and the circuit quiescent, capacity C will be charged to the value of battery 16 (here 3V). Pin 4 of the integrated circuit will be held at 0 volts which is the voltage arbitrarily designated at node 18. The integrated circuit IC will be in reset condition having the effect that there will be a positive voltage at pin 7, rendering the transistor T1 non-conducting and preventing the supply of power to the output circuit 17.

When motion of the lure causes switch 10 to close, (performing an off-to-on transition), it closes the connection from the positive side of battery 16, over now closed N7–N8 gap, to pin 4; the "0" to "1" or 0 volt to 3 volt change at pin 4 causes the integrated circuit to go to "set" condition causing pin 7 of the integrated IC to go to 0 volts. This causes T1 to conduct, allowing the supply of power to output circuit 17 to cause operation of components of the output circuit hereinafter described. The initiation of "set" condition in integrated circuit IC connects pin 3 with node 18, and, in a time determined by C and R1 the circuit is returned to "reset" condition, turning off T1, thus terminating the flow of power to output circuit 17 and terminating the supply of power to the output circuit, (ending the power interval) and allowing C to recharge. The integrated circuitry IC is further designed so that switch 10 must be turned off (an on-to-off transition) and on again (an off-to-on transition) before integrated circuit IC may again be activated by switch 10 to set state.

The preferred motion responsive switch 10 is best shown in FIG. 6 and comprises a conducting cylinder 41 having a conducting end 43 and an insulating end 45. The line 47 from battery 26 is connected to conducting end 43. The line 48 leading to pin 4 is connected through insulating end 45 to a terminal 51. When the ball moves, under motion of the switch and lure to connect terminal 51 and cylinder 41, it closes the switch and performs an off-to-on transition. In other positions the switch is open.

The switch shown may be replaced by any other motion responsive switch such as a switch where, under motion, a pendular contact from time to time contacts a stationary contact. The switch 10 may be replaced by a mercury switch 20 although mercury is by some considered a danger as a potential pollutant. The switch may also be piezotronic where the signal to pin 4 is caused by impacting or flexing the piezo element.

It is now desired to describe the illumination circuit 17 in the form shown in FIG. 4. As shown, this comprises a National Semiconductor Chip Number 3909 connected as shown on FIG. 4 as oscillator 33. The basic multivibrator circuit of oscillator 33 is modified by the use of a higher capacity capacitor CM to produce a longer power interval which, for example may be two seconds. The connections 53 and 55 from timing circuit 15 are connected to the battery terminals 4 and 5 respectively of the chip 33. When, due to an off-to-on transition at pin 4 of the integrated circuit IC, conduction is initiated through T1, a quartz crystal in chip 33 vibrates to cause periodic power to be applied intermittently (as selected) to the chip output terminals 8 and 7. The rate of vibration can be varied by changing the value of capacitor CM connected between terminals 2 and 8 of chip 33.

Terminals 8 and 7 are shown as connected across three output devices in parallel. Firstly, a pair of LEDs 12 and 12R respectively oriented to conduct when terminal 8 is positive and negative relative to terminal 7.

Terminals 8 and 7 are also shown as connected across the inputs of a speaker, preferably a piezo speaker 57 causing an aural output believed not only detectable but attractive to the fish. The operation and frequency of the speaker will be discussed hereafter.

Terminals 8 and 7 are also shown as connected across the input of a step-down transformer 59 whose output is connected to the field effect probes 29 and 31 as shown in FIG. 1 or 2 or to a pair of probes otherwise located.

It is emphasized that instead of having all three devices connected in parallel, any one may be used singly or any selection of pairs may be used. Moreover, the devices need not be connected in simple parallel arrangement as hereinafter discussed.

It is now desired to discuss the devices singly.

The LED's 12 and 12R if connected as shown will flash on alternate oscillator ½ cycles. If required, LED's may be connected in parallel with those shown. It is within the scope of the invention to have the LED's on steadily for the power interval (see FIG. 5).

In connection with the LEDs 12 and 12R it is noted that there may be connected more LED's of either polarity in parallel with those shown. It is also noted that the LED's, instead of being connected to the oscillator as shown, could be connected to nodes N1 and N2. Thus, the LED's would be continuously on for the duration of the power interval.

Figure 3:
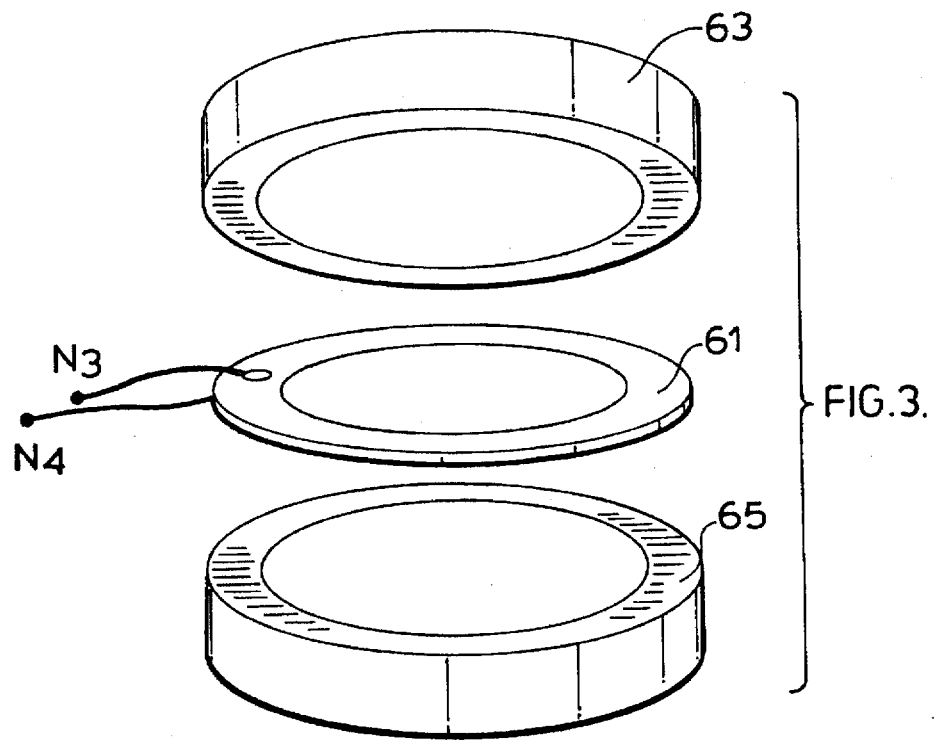
FIG. 3 shows a speaker using a piezotronic diaphragm.

The piezotronic speaker is preferably constructed as shown in FIG. 3. Here, a piezotronic diaphragm 61 has lines from N3 and N4, respectively connected to opposite sides of the diaphragm in the occurrence of a potential difference between N3 and N4, in either polarity, the piezotronic diaphragm will vibrate for a short interval at a frequency determined by the piezotronic diaphragm. Thus the oscillator half cycle outputs from terminals 7 and 8 will individually activate the piezotronic diaphragm at a frequency determined by the oscillator, while the pitch of the speaker output is determined by the diaphragm. A pair of (usually plastic) sealing elements 63 and 65 are fastened on each side of the diaphragm to seal it. In spite of such sealing, the tone from the diaphragm will be heard outside the diaphragm and, indeed, outside the lure if the diaphragm assembly is enclosed or encapsulated therein. If the pitch of the piezotronic speaker output is too high or unsatisfactory, an ordinary speaker may be connected to the output of an oscillator so that the speaker frequency is determined by the oscillator.

Connected in parallel with the LEDs and speakers is a step down transformer 59 having its input winding connected to nodes N3 and N4 and its output windings connected to the field effect probes. Thus when there is a pulse passing through the transformer, a field is created by the pulse which field is believed to attract the fish. The amount of the step down or the necessity of a step down should be individually determined for different fish species is not known.

The water resistance between the field effect probes is found sufficient to prevent the LED's or speakers being shorted out.

A step up transformer, could of course be employed if desired.

FIG. 5 shows a simple output circuit connected to N1 and N2 which may be used instead of the illumination circuit 17 of FIG. 4. The circuitry simply connects the piezotronic (or other) speaker) the LED or LED's;and transformer for the field effect probes in parallel across the timing circuit output. The LED(s) must, however be connected in the correct polarity.

The alternative of FIG. 5 emphasizes the fact that, with the circuitry of FIG. 4 any of the parallel circuit elements may be connected across the timing circuit outputs N1 and N2 to be activated or "on" during the entire power interval. The piezotronic speaker connected across the N1 and N2 terminals would merely give a brief signal at the beginning of the power interval. An ordinary speaker would not work if connected in accord with FIG. 5.

Any different oscillator or a different sequence device could be used for any or all of the speaker light and probe elements and each element could be differently energized.

FIG. 7 shows an alternate timing circuit to timing circuit 15 shown in FIG. 4 and adapted to be connected to an output circuit across nodes N1 and N2.

In FIG. 7 is shown an alternate circuit to that of FIG. 4. In FIG. 7 the integrated circuit IC is replaced by discrete elements. A schematic distribution of these elements in the lure is not shown but is will be realized that they are placed as found convenient while the LED's are placed as shown in FIGS. 1 or 2 (or otherwise).

Exemplary only values of the circuit elements of FIG. 7 are indicated below:

7 R1—1 MEGOHM
7 R2—1 KILOHM
7 R3—100 KILOHM
7 R4—47 KILOHM
7 R5—1 KILOHM
7 C1—0.1 µF
7 C2—10 µF
7 T1—2N3906 PNP
7 T2—2N3904 NPN
12—LIGHT SOURCES (LEDS)
20—ACTIVATION SWITCH, MERCURY *
*(A mechanical or a piezotronic switch may be used)

FIG. 7 shows a simple one shot circuit with discrete elements having an output connected to nodes N1 and N2 for connection to an output circuit.

In FIG. 7 the battery 26 is to be connected to the motion responsive switch over lines 79 and 81. Between these lines, is the emitter, collector of transistor T3, which with the transistor T2 and probes 11 and 13 is connected and operates in the same manner as the same elements in FIG. 4.

Thus when probes 11 and 13 are in water, battery 26 is connected to motion responsive switch 20. When probes 11 and 13 are out of the water, the battery is disconnected from the switch.

Thus the ensuing discussion of the operation of FIG. 7 assumes that probes 11 and 13 are in water and battery 26 is connected to switch 20.

In FIG. 7 the timing circuit is connected to the output circuit 17 at nodes N1 and N2.

When mercury switch 20 is closed, providing an off-to-on transition, it applies positive voltage to 7C1 and the base of 7T2. This will cause 7T2 to conduct. This, in turn, causes the LEDS 12 to turn on.

7T2 conducting also connects the negative side of 7C2 to the negative side of the battery. This will place the base of 7T1 at a potential less positive than its emitter which will cause it to conduct. 7T1 supplies positive voltage to the voltage divider 7R2 and 7R3 which supplies positive voltage to the base of 7T2. This will hold 7T2 on after 7C1 has charged and no longer conducts current to the base of T2.

The RC network formed by the resistors 7R4, 7R5, and 7C2 determines the length of time the LEDs will be on. When 7C2 charges, the potential on the base of 7T1 becomes less negative and 7T1 will cease to conduct. This, in turn removes the positive bias from the base of 7T2 which will turn off and current will cease to flow to the LEDs.

To repeat the cycle, switch 20 must be opened and then reclosed to provide a new off-to-on transition of the switch 20.

Thus if, for any reason the switch 20 remains closed the LED's will be extinguished by the circuit described above after the power interval provided by the output circuit.

It is within the scope of the invention to combine the timing circuitry of FIG. 7 with an oscillator circuit, in which case the output 17 circuit of FIG. 4 would be connected across nodes N1 and N2 in place of the output circuit of FIG. 5. However, the power interval provided by the timing circuit of FIG. 7 is scarcely long enough to produce a useful sequence of flashes.

The switch 10 of FIG. 4 is interchangeable with the mercury switch 20 as is any other motion responsive switch.

It cannot be said that the circuit of FIG. 6 is always preferable over that of FIG. 7 or vice versa. The circuitry of FIG. 7 is somewhat simpler. However, the circuitry of FIG. 6 may be made extremely compact. The integrated circuit of FIG. 6 may take advantage of a process called "on board integrated circuitry". In this process the integrated circuit, IC, is actually built into a (very small) circuit board and covered with a dot of epoxy. The size of the integrated circuit of FIG. 6 is about 3/16 inch in diameter and only 1/32 of an inch thick.

The circuits of FIG. 6 or FIG. 7 would require 3V power but it is preferred to use two 1½V batteries in series. These batteries are collectively shown and referred to as battery 26.

In FIG. 8 is shown a timing circuit similar to timing circuit 13 of FIG. 4 except that motion responsive switch 10 between nodes N5 and N6 has been removed and a piezotronic circuit connected (as the motion responsive switch) instead. Thus a piezotronic member M9 which may be an n-channel Mosfet transistor comprises a source S, drain D and gate G. The source is connected through resistor R9 to N6 and the drain to N5. The piezotronic element P9, a resistance R10, and diode D9 are connected in parallel between the gate and along line 63 to node 18. The diode is poled to conduct toward the gate.

In use, an impact on or a flexure of the piezotronic member P9, by means, not shown, but easily available to those skilled in the art, applies a signal to the gate. The negative cycle of any such signal is grounded through diode D9. A positive signal causes conduction from drain to source and, as in the otherwise identical circuitry of FIG. 4 (see page 7 starting at line 19) closes the connection from battery 26 to pin 4 causing the integrated circuit to go to "set" condition, initiating the power interval of the timing circuit and consequent activation of the output circuit. As with the other alternative circuits further signals during the power interval from P9 and conduction through M9, have no effect on the timing of the power interval or the downstream operator of the circuits. As before a new power interval may only be initiated by conduction through M9 initiated after previous power interval has terminated.

The piezotronic circuit may also be used with the circuitry of FIG. 7 by removing mercury switch 20 from between N5 and N6, and there connecting the drain and source, respectively, of the piezotronic circuit while the line 63 is connected to the negative of battery 26.

I claim:

1. Fishing lure having an outer surface and comprising;
a battery,
a timing circuit, tapted to time the duration of a power interval,
a motion responsive switch, for controllably connecting said battery to timing circuit,
an output circuit,
an output switch, controlled by said timing circuit for controllably connecting said battery to said output circuit,
said motion responsive switch being adapted to provide alternating off-to-on and on-to-off transitions,
said timing circuit being responsive to an off-to-on transition, when not timing a power interval, to initiate the timing of a power interval and to provide power from said battery to the output circuit, the duration of said power interval,
said timing circuit maintaining said output switch open outside said interval,
a set of field effect probes connected to said output circuit, exposed to the surface of said lure, connected to have a voltage differential therebetween derived from said battery, at least once during each power interval, whereby said field effect probes create an electric field in water surrounding said lure,
whereby such off-to-on transition will initiate said power interval and provide battery power to said output circuit to create a voltage between said field effect probes.

2. Fishing lure as claimed in claim 1 wherein said output circuit includes an oscillator, and wherein said output circuit energizes said oscillator during said power interval and said field effect probes are energized at a frequency determined by said oscillator.

3. Fishing lure as claimed in claim 1 wherein voltage reducing means is located between said field effect probes.

4. Fishing lure as claimed in claim 2 wherein voltage reducing means is located between said field effect probes.

5. Fishing lure as claimed in claim 1 wherein said timing circuit includes a pair of water sensing probes exposed to the surface of said lure which, in the absence of conduction between them, prevents timing of a power interval responsive to said off-to-on transition.

6. Fishing lure as claimed in claim 2 wherein said timing circuit includes a pair of water sensing probes exposed to the surface of said lure which, in the absence of conduction between them, prevents timing of a power interval responsive to said off-to-on transition.

7. Fishing lure as claimed in claim 1 wherein said output circuit includes a light connected to turn on at least once during said power interval.

8. Fishing lure as claimed in claim 2 wherein said output circuit includes a light connected to turn on at least once during said power interval.

9. Fishing lure as claimed in claim 8 wherein said output circuit is connected to turn said light on and off at a frequency determined by said oscillator.

10. Fishing lure as claimed in claim 2 including a speaker adapted to produce pressure waves.

11. Fishing lure as claimed in claim 4 including a speaker adapted to produce pressure waves.

12. Fishing lure as claimed in claim 9 wherein said timing circuit includes a pair of water sensing probes exposed to the surface of said lure which, in the absence of conduction between them, prevents timing of a power interval responsive to said off-to-on transition.

13. Fishing lure as claimed in claim 10 wherein said timing circuit includes a pair of water sensing probes exposed to the surface of said lure connected, in the absence of conduction between them, prevents timing of a power interval responsive to said off-to-on transition.

14. A lure comprising:
a battery,
a timing circuit, adapted to time the duration of power interval,
a motion responsive switch, for controllaby connecting said battery to said timing circuit,
an output circuit,
an output switch, controlled by said timing circuit for controllably connecting said battery to said output circuit for the duration of said power interval,
said motion responsive switch providing, under motion, alternating off-to-on and providing on-to-off transitions,
said timing circuit being responsive to an off-to-on transition, occur outside a power interval, to initiate a power interval and to provide power, from said battery to the output circuit, for the duration of said power interval,
said timing circuit maintaining said output switch open outside said power interval,
two potential output terminals in said output circuit connected to provide a potential, derived from said battery, across said potential output terminals during the power interval and a piezotronic speaker connected across said potential output terminals, whereby such off-to-on transition will initiate said power interval and provide battery power to said output circuit to energize said piezotronic speaker.

15. A lure comprising:

a battery, a timing circuit adapted to time the duration of a power Interval, a motion responsive switch for controllably connecting said battery to said timing circuit, an output circuit, an output switch controlled by said timing circuit for controllably connecting said battery to said output circuit for the duration of said power interval, said motion responsive switch being adapted to provide under motion alternating off-to-on and on-to-off transitions, said timing circuit being responsive to an off-to-on transition, occuring outside a power interval to initiate a power interval and to provide power from said battery to the output circuit, for the duration, of said power interval, said timing circuit maintaining said output switch open outside said power wherein said output circuit includes an oscillator activated by said battery during said power interval, and an audio speaker connected to an output of said oscillator, whereby said off-to-on transition will initiates said power interval and provide battery power to said output circuit to cause operation of said audio speaker.

16. A lure as claimed in claim 15 having a light connected t be on at least once during said power interval.

17. A lure as claimed in claim 16 having a light connected to flash with the frequency determined by said oscillator.

18. A lure as claimed in claim 15 including a pair of water sensing probes exposed to the surface of said lure said probes which, in the absence of conduction between them, prevents timing of a power interval responsive to said off-to-on transition.

* * * * *